(12) United States Patent
Li

(10) Patent No.: US 11,566,130 B2
(45) Date of Patent: Jan. 31, 2023

(54) LIGHT BARRIER COMPOSITIONS AND ARTICLES COMPRISING SAME

(71) Applicant: Plastipak Packaging, Inc., Plymouth, MI (US)

(72) Inventor: Shenshen Li, Park Ridge, IL (US)

(73) Assignee: PLASTIPAK PACKAGING, INC., Plymouth, MI (US)

(*) Notice: Subject to any disclaimer, the term of this patent is extended or adjusted under 35 U.S.C. 154(b) by 0 days.

(21) Appl. No.: 15/365,415

(22) Filed: Nov. 30, 2016

(65) Prior Publication Data

US 2017/0306143 A1    Oct. 26, 2017

Related U.S. Application Data

(60) Provisional application No. 62/261,484, filed on Dec. 1, 2015.

(51) Int. Cl.
*C08L 67/02* (2006.01)
*B65D 1/02* (2006.01)
(Continued)

(52) U.S. Cl.
CPC .............. *C08L 67/02* (2013.01); *B29B 11/08* (2013.01); *B29C 49/22* (2013.01); *B65D 1/0207* (2013.01); *B65D 1/12* (2013.01); *B65D 65/38* (2013.01); *B65D 81/30* (2013.01); *C08L 2203/10* (2013.01); *C08L 2203/16* (2013.01); *C08L 2205/02* (2013.01)

(58) Field of Classification Search
CPC ........ B65D 1/12; B65D 1/0207; B65D 81/30; B65D 65/38; C08G 69/26; C08L 67/02; C08L 2203/10; C08L 2203/16; C08L 2205/02

See application file for complete search history.

(56) References Cited

U.S. PATENT DOCUMENTS

| 4,161,579 | A | | 7/1979 | Edelman et al. |
| 5,208,277 | A | * | 5/1993 | Boudreaux, Jr. ........ C08K 7/14 |
| | | | | 523/523 |

(Continued)

FOREIGN PATENT DOCUMENTS

| EP | 2132597 | 12/2009 |
| WO | WO-2009/079724 A2 | 7/2009 |

(Continued)

OTHER PUBLICATIONS

International Search Report and Written Opinion dated Apr. 14, 2017 by the International Searching Authority for International Patent Application No. PCT/US2016/064226, which was filed on Nov. 30, 2016 and published as WO 2017/095931 on Jun. 8, 2017 (Inventor—Shenshen Li; Applicant—Plastipak Packaging, Inc.) (14 pages).

(Continued)

*Primary Examiner* — Bijan Ahvazi
(74) *Attorney, Agent, or Firm* — Ballard Spahr LLP

(57) ABSTRACT

The disclosure relates to light barrier compositions, methods of making the compositions, articles prepared from the compositions, and methods of making the articles. This abstract is intended as a scanning tool for purposes of searching in the particular art and is not intended to be limiting of the present invention.

12 Claims, 1 Drawing Sheet

(51) Int. Cl.
*B65D 1/12* (2006.01)
*B29C 49/22* (2006.01)
*B29B 11/08* (2006.01)
*B65D 65/38* (2006.01)
*B65D 81/30* (2006.01)

(56) References Cited

U.S. PATENT DOCUMENTS

| | | | | |
|---|---|---|---|---|
| 5,534,593 A | * | 7/1996 | Friedman | C08J 5/18 525/240 |
| 5,660,931 A | | 8/1997 | Kim et al. | |
| 6,005,068 A | | 12/1999 | Gruber et al. | |
| 6,096,684 A | | 8/2000 | Sasaki et al. | |
| 2011/0045222 A1 | * | 2/2011 | Peters | C08L 67/02 428/35.8 |
| 2011/0213101 A1 | * | 9/2011 | Shi | C08L 67/02 525/437 |
| 2013/0004760 A1 | * | 1/2013 | Pellingra | C08J 5/18 428/220 |

FOREIGN PATENT DOCUMENTS

| | | |
|---|---|---|
| WO | WO 2009079724 A2 * | 7/2009 |
| WO | WO-2015/007921 A1 | 1/2015 |
| WO | WO-2017/095931 A1 | 6/2017 |

OTHER PUBLICATIONS

U.S. Appl. No. 62/261,484, filed Dec. 1, 2015, Shenshen Li.
PCT/US16/64226, Nov. 30, 2016, Shenshen Li.
European Search Report and Written Opinion dated Oct. 8, 2019 by the European Patent Office for EP Application No. 16871427, filed on Nov. 30, 2016 and published as EP 3383944 on Oct. 10, 2018 (Applicant—Plastipak Packaging, Inc.) (12 Pages).
Examination Report dated May 1, 2020 by the Australian Patent Office for AU Application No. 2016364724, filed on Nov. 30, 2016 (Applicant—Plastipak Packaging, Inc.) (6 Pages).
Examination Report dated Oct. 2, 2020 by the European Search Authority for EP Application No. 16871427.7, filed on Nov. 30, 2016 and published as EP 3383944 on Oct. 10, 2018 (Applicant—Plastipak Packaging, Inc.) (5 pages).

* cited by examiner

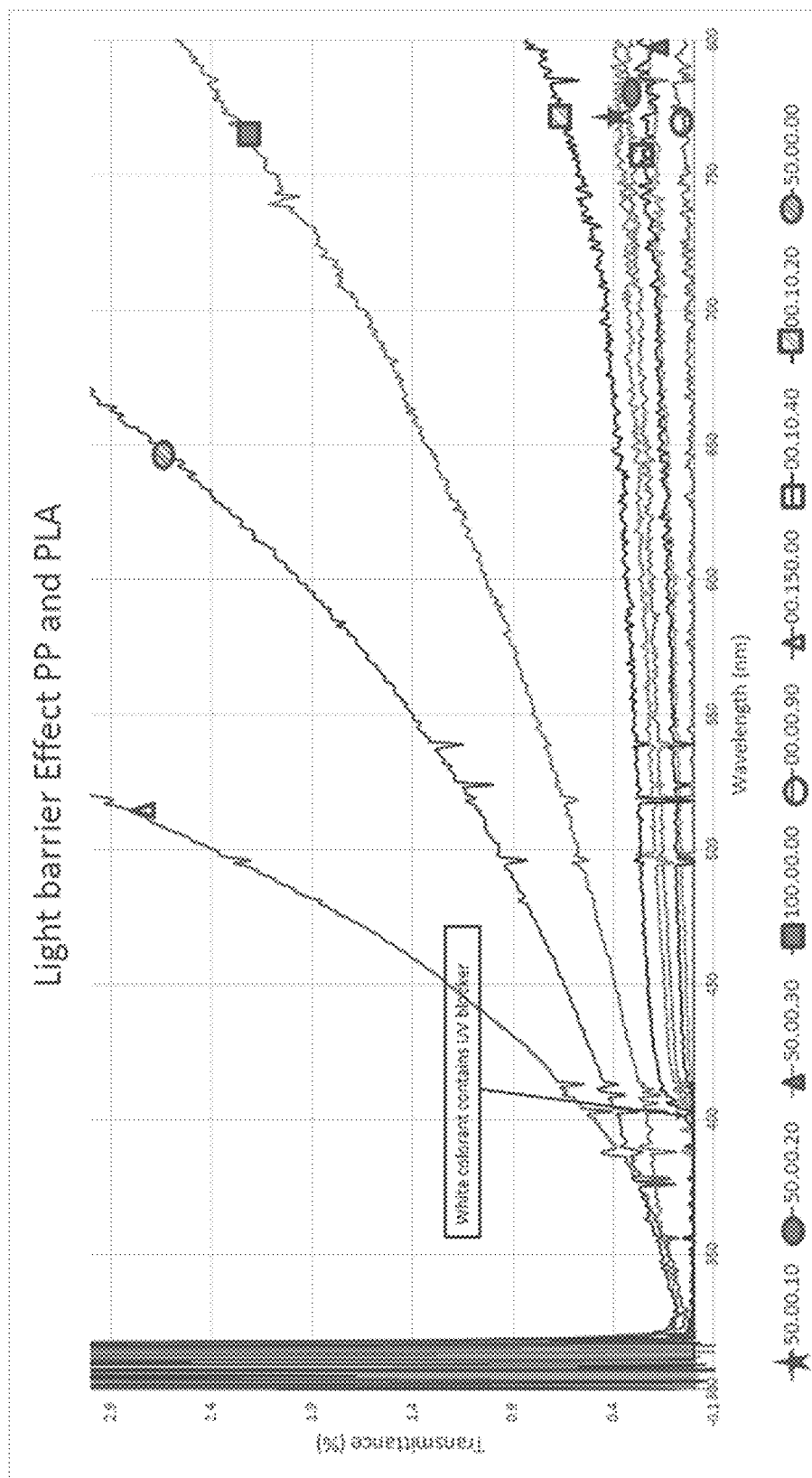

LIGHT BARRIER COMPOSITIONS AND ARTICLES COMPRISING SAME

CROSS-REFERENCE TO RELATED APPLICATIONS

This application claims the benefit of priority to U.S. Provisional Application No. 62/261,484, filed on Dec. 1, 2015, which is incorporated herein by reference in its entirety.

FIELD OF THE INVENTION

The present invention relates to light barrier compositions and methods of making the compositions. The invention also relates to articles prepared from the compositions and methods of making the articles.

BACKGROUND

The instability of vitamins such as B2 (riboflavin), B6, and B12, during processing and storage can contribute to a decrease in the nutritional quality of milk, as well as dairy products derived therefrom. Additionally, the secondary degradation of lipids can result in off-flavours, usually referred to as creating a "light-affected taste." Radiation with wavelengths ranging from 350 to 520 nm appear to be responsible for the degradation of these vitamins and also therefore for the impairment in the taste of the product.

Consequently, storage containers or the packaging for these containers must have an extremely low light transmission for radiation in this range, including ultraviolet (UV) radiation and visible radiation. This specification becomes increasingly important as the storage time of the milk is extended, as in ultra-high temperature treatment (UHT) milk. Accordingly, numerous approaches have been undertaken in an effort to protect packaged dairy products from these rays.

A variety of additives have been integrated into plastic-packaging materials in an attempt to block or absorb UV radiation. Unfortunately, the transparency of the container is often sacrificed. Additionally, the product may develop an opacity or color from their use.

The most commonly used pigment for blocking UV light is the white pigment titanium dioxide. Unfortunately, the transparency of the container is often impaired. Indeed, the presence of titanium dioxide in an amount as low as 2-10 wt % yields opaque white plastic materials. The resulting color of the container is also quite dull, making it undesirable to the consumer. Additional disadvantages of titanium dioxide include its high cost and weight.

Thus, there is a need for light barrier compositions that can be manufactured in a form that exhibits an appealing visual appearance, that are cost efficient, and that ultimately result in a lighter container in the manufacturing process of light barrier packaging materials and other articles. These needs and other needs are satisfied by the present invention.

SUMMARY

In accordance with the purpose(s) of the invention, as embodied and broadly described herein, the invention, in one aspect, relates to oxygen scavenging compositions, methods of making the compositions, articles prepared from the compositions, and methods of making the articles.

Disclosed are polymer blend compositions comprising polyethylene terephthalate (PET) and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups, wherein the transmittance is less than about 1.5% at a wavelength of from about 400 nm to about 700 nm.

Also disclosed are polymer blend compositions comprising: (a) polyethylene terephthalate (PET); and (b) polypropylene (PP), wherein the transmittance is less than about 1.5% at a wavelength of from about 400 nm to about 700 nm.

Also disclosed are polymer blend compositions comprising: (a) polyethylene terephthalate (PET); and (b) polylactic acid (PLA), wherein the transmittance is less than about 1.5% at a wavelength of from about 400 nm to about 700 nm.

Also disclosed are polymer blend compositions comprising: (a) polyethylene terephthalate (PET); (b) polypropylene (PP); (c) polylactic acid (PLA); and (d) a colorant.

Also disclosed are walls of a container comprising at least one layer, wherein the layer comprises a composition comprising polyethylene terephthalate (PET) and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups.

Also disclosed are walls of a container comprising at least one layer, wherein the layer comprises a composition comprising: (a) polyethylene terephthalate (PET); and (b) polylactic acid (PP).

Also disclosed are walls of a container comprising at least one layer, wherein the layer comprises a composition comprising: (a) polyethylene terephthalate (PET); and (b) polylactic acid (PLA).

Also disclosed are preforms comprising at least one layer, wherein the layer comprises a composition comprising polyethylene terephthalate (PET) and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups.

Also disclosed are preforms comprising at least one layer, wherein the layer comprises a composition comprising: (a) polyethylene terephthalate (PET); and (b) polylactic acid (PP).

Also disclosed are preforms comprising at least one layer, wherein the layer comprises a composition comprising: (a) polyethylene terephthalate (PET); and (b) polylactic acid (PLA).

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The accompanying figures, which are incorporated in and constitute a part of this specification, illustrate several aspects and together with the description serve to explain the principles of the invention.

FIG. 1 shows a representative graph illustrating the light barrier performance of polymer compositions prepared using various let-down ratios of compositions containing varying amounts of polypropylene, polylactic acid, and/or colorant.

Additional advantages of the invention will be set forth in part in the description which follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including steps in methods of making and using the compositions of the invention. Thus, if there are a variety of additional steps that can be performed it is understood that each of these additional steps can be performed with any specific embodiment or combination of embodiments of the methods of the invention.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications are referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present invention is not entitled to antedate such publication by virtue of prior invention. Further, the dates of publication provided herein may be different from the actual publication dates, which can require independent confirmation.

A. Definitions

As used in the specification and the appended claims, the singular forms "a," "an" and "the" include plural referents unless the context clearly dictates otherwise. Thus, for example, reference to "a functional group," "an alkyl," or "a residue" includes mixtures of two or more such functional groups, alkyls, or residues, and the like. Alternatively, for example, reference to processing or making a "polymer," "preform," "article," "container," or "bottle" is intended to include the processing or making of a plurality of polymers, preforms, articles, containers, or bottles.

For example, when a "polymer" is referred to in the specification and the claims, the term should be construed to include not just the reaction product of a single polymerization, but also to blends or physical mixtures of more than one polymer, since the thermoplastic polymers described herein may be satisfactorily blended with one another so that it may be difficult to afterward identify the source. Thus, the phrase a "PET homopolymer or copolymer" (sometimes hereinafter described simply as a "PET polymer") should be construed, for example, to include both the product of a single polymerization as well as mixtures of more than one PET homopolymer or copolymer. Likewise, the phrase a "polyolefin polymer" or a "polybutadiene homopolymer or copolymer" should be construed, for example, to include both the reaction product of a single polymerization as well as mixtures of more than one polybutadiene homopolymer or copolymer.

References to a composition or a polymer blend containing "an" ingredient or "a" polymer is intended to include other ingredients or other polymers, respectively, in addition to the one named.

By "comprising" or "containing" or "having" it is intended that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

When it is stated, for example, that an oxygen-scavenging polymer is added to, blended with, or reacted with the PET polymer, the oxygen-scavenging polymer may either be added neat or as a concentrate, unless the context indicates otherwise. Furthermore, when the oxygen-scavenging polymer is functionalized and capable of reacting with the PET polymer, the oxygen-scavenging polymer may be added as a copolycondensate.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance may or may not occur, and that the description includes instances where said event or circumstance occurs and instances where it does not.

As used herein, the term "substantially" means that the subsequently described event or circumstance completely occurs or that the subsequently described event or circumstance generally, typically, or approximately occurs. For example, when the specification discloses that substantially all of an agent is released, a person skilled in the relevant art would readily understand that the agent need not be completely released. Rather, this term conveys to a person skilled in the relevant art that the agent need only be released to an extent that an effective amount is no longer unreleased.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers. The number of monomers/constitutional units within a given polymer may vary widely, ranging, for example, from 5 to 10 to 25 to 50 to 100 to 1000 to 10,000 or more monomer units.

As used herein, the term "monomers" may refer to the free monomers and those that are incorporated into polymers, with the distinction being clear from the context in which the term is used.

As used herein, the term "homopolymer" refers to a polymer formed from a single type of monomer are called homopolymers As used herein, the term "copolymer" refers to a polymer formed from two or more different repeating units (monomer residues). The two or more types of monomers within a given copolymer may be present in any of a variety of distributions including random, statistical, gradient and periodic (e.g., alternating) distributions, among others. One particular type of copolymer is a "block copolymer," which as used herein is a copolymer that contains two or more polymer chains of different composition, which chains may be selected from homopolymer chains and copolymer chains (e.g., random, statistical, gradient or periodic copolymer chains). As used herein, a polymer "chain" is a linear assembly of monomers and may correspond to an entire polymer or to a portion of a polymer. By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, "polyester polymer" refers to a condensation polymer in which more than 50 percent of the groups connecting repeat units are ester groups. Thus polyesters may include polyesters, poly(ester-amides) and poly(ester-imides), so long as more than half of the connecting groups are ester groups. For example, suitable polyester polymers can have at least 70% of the connecting groups as esters. Alternatively, suitable polyester polymers can have at least 90% of the connecting groups as ester. In a further example, polyester polymers can have essentially all of the connecting groups as esters. The proportion of ester connecting groups can be estimated to a first approximation by the molar ratios of monomers used to make the polyester.

As used herein, the terms "polyethylene terephthalate" and "PET" refer to a polyester polymer in which the diol repeat units are from ethylene glycol and the dicarboxylic acid repeat units are from terephthalic acid. These terms are meant to include PET no matter how prepared. For example, a monomer used in the preparation of PET can be synthesized by the esterification reaction between terephthalic acid and ethylene glycol with water as a byproduct. Alternatively, a monomer used in the preparation of PET can be prepared by the transesterification reaction between ethylene glycol and dimethyl terephthalate with methanol as a byproduct. Polymerization can be through a polycondensation reaction of the monomers with ethylene glycol as the byproduct.

Furthermore, these terms, PET or polyethylene terephthalate, are meant to include polyethylene terephthalate polymers which are reacted with minor, e.g., less than about 20 percent by weight of the polymer, amounts of modifying agents. Such modifying agents include various diols such as 1,4 butane diol, cyclohexane dimethanol and 1,3 propane diol. Other modifying agents include various diacids such as isophthalic acid, adipic acid, 2,6 naphthalene dicarboxylic acid and p-hydroxy benzoic acid. Minor amounts of chain branching agents and/or chain terminating agents may also be used. Such chain branching agents include, for example, polyfunctional acids and/or polyfunctional alcohols such as trimethylol propane and pentaerythritol. Chain terminating agents include monofunctional alcohols and/or monofunctional carboxylic acids such as stearic acid and benzoic acid. Mixtures of the chain branching and chain terminating agents may also be used. PET which contains such chain branching agents and chain terminating agents is described in U.S. Ser. No. 894,674 filed Apr. 10, 1978 (now U.S. Pat.

No. 4,161,579) by Edelman et al and entitled "Extrusion Grade Polyethylene Terephthalate". The disclosure of this patent application is hereby incorporated by reference. Although the terms "polyethylene terephthalate" and "PET" are meant to include polyethylene terephthalate polymers containing minor amounts of modifying agents or chain branching agents, the remainder of this specification, for purposes of illustration, is generally directed to PET which does not contain these modifying agents or chain branching agents.

Furthermore, these terms, PET or polyethylene terephthalate, refer to a thermoplastic polyester resin that can exist both as an amorphous (transparent) and as a semicrystalline (opaque and white) material. PET can also exist as a semicrystalline transparent material, as used in the side walls of PET bottles. In such aspects, the crystals are smaller than the wavelength of visible light and thus do not make the material opaque and white.

It is understood that these terms, "polyethylene terephthalate" and "PET," include both PET polymers and copolymers. For example, PET can be provided as a copolymer having, in addition to terephthalic acid residues and ethylene glycol residues, additional isophthalic acid residues and/or cycloheanedimethanol residues. It is also understood that PET polymer and/or copolymer can be provided as part of a polymer blend.

As used throughout the specification, "ppm" is parts per million by weight.

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

A residue of a chemical species, as used in the specification and concluding claims, refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —OCH$_2$CH$_2$O— units in the polyester, regardless of whether ethylene glycol was used to prepare the polyester. Similarly, a sebacic acid residue in a polyester refers to one or more —CO(CH$_2$)$_8$CO— moieties in the polyester, regardless of whether the residue is obtained by reacting sebacic acid or an ester thereof to obtain the polyester.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure

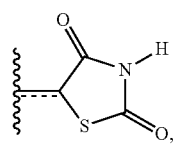

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

In some aspects, a structure of a compound can be represented by a formula:

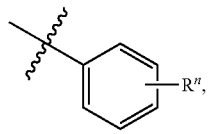

which is understood to be equivalent to a formula:

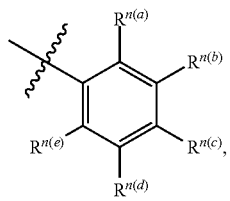

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

B. Polymer Blend Compositions

In one aspect, the invention relates to polymer blend compositions comprising polyethylene terephthalate (PET) and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups, wherein the transmittance is less than about 1.5% at a wavelength of from about 400 nm to about 700 nm.

In one aspect, the invention relates to polymer blend compositions comprising: (a) polyethylene terephthalate (PET); and (b) polypropylene (PP), wherein the transmittance is less than about 1.5% at a wavelength of from about 400 nm to about 700 nm.

In one aspect, the invention relates to polymer blend compositions comprising: (a) polyethylene terephthalate (PET); and (b) polylactic acid (PLA), wherein the transmittance is less than about 1.5% at a wavelength of from about 400 nm to about 700 nm.

In one aspect, the invention relates to polymer blend compositions comprising: (a) polyethylene terephthalate (PET); (b) polypropylene (PP); (c) polylactic acid (PLA); and (d) a colorant.

The disclosed light barrier compositions are advantageously highly light scattering and, accordingly, can be useful in the preparation of, for example, the packaging of dairy products. Additional benefits of the disclosed compositions and products made therefrom include, but are not limited to, a reduction in cost, an appealing visual appearance, and a reduction in weight.

In a further aspect, the transmittance is less than about 1.5% at a wavelength of from about 400 nm to about 700 nm. In a still further aspect, the transmittance is less than about 1.5% at a wavelength of from about 450 nm to about 700 nm. In yet a further aspect, the transmittance is less than about 1.5% at a wavelength of from about 500 nm to about 700 nm. In an even further aspect, the transmittance is less than about 1.5% at a wavelength of from about 400 nm to about 650 nm. In a still further aspect, the transmittance is less than about 1.5% at a wavelength of from about 400 nm to about 600 nm. In yet a further aspect, the transmittance is less than about 1.5% at a wavelength of from about 500 nm to about 600 nm.

In a further aspect, the transmittance is less than about 1.0% at a wavelength of from about 400 nm to about 700 nm. In a still further aspect, the transmittance is less than about 1.0% at a wavelength of from about 450 nm to about 700 nm. In yet a further aspect, the transmittance is less than about 1.0% at a wavelength of from about 500 nm to about 700 nm. In an even further aspect, the transmittance is less than about 1.0% at a wavelength of from about 400 nm to about 650 nm. In a still further aspect, the transmittance is less than about 1.0% at a wavelength of from about 500 nm to about 600 nm.

In a further aspect, the transmittance is less than about 0.5% at a wavelength of from about 400 nm to about 700 nm. In a still further aspect, the transmittance is less than about 0.5% at a wavelength of from about 450 nm to about 700 nm. In yet a further aspect, the transmittance is less than about 0.5% at a wavelength of from about 500 nm to about 700 nm. In an even further aspect, the transmittance is less than about 0.5% at a wavelength of from about 400 nm to about 650 nm. In a still further aspect, the transmittance is less than about 0.5% at a wavelength of from about 400 nm to about 600 nm. In yet a further aspect, the transmittance is less than about 0.5% at a wavelength of from about 500 nm to about 600 nm.

In a further aspect, PET is present in an amount of at least about 60 wt % based on the weight of the composition, PP is present in an amount of from about 1 wt % to about 25 wt % based on the weight of the composition, PLA is present in an amount of from 0 wt % to about 20 wt % based on the weight of the composition, and the colorant is present in an amount of from 0 wt % to about 10 wt % based on the weight of the composition. In a still further aspect, PET is present in an amount of at least about 60 wt % based on the weight of the composition, PP is present in an amount of from about 5 wt % to about 25 wt % based on the weight of the composition, PLA is present in an amount of from about 1 wt % to about 20 wt % based on the weight of the composition, and the colorant is present in an amount of from about 1 wt % to about 10 wt % based on the weight of the composition. In yet a further aspect, PET is present in an amount of at least about 60 wt % based on the weight of the composition, PP is present in an amount of from about 5 wt % to about 15 wt % based on the weight of the composition, PLA is present in an amount of from about 1 wt % to about 10 wt % based on the weight of the composition, and the colorant is present in an amount of from about 1 wt % to about 5 wt % based on the weight of the composition. In an even further aspect, PET is present in an amount of at least about 60 wt % based on the weight of the composition, PP is present in an amount of from about 5 wt % to about 10 wt % based on the weight of the composition, PLA is present in an amount of from about 1 wt % to about 5 wt % based on the weight of the composition, and the colorant is present in an amount of from about 1 wt % to about 3 wt % based on the weight of the composition.

In a further aspect, PET is present in an amount of at least about 82 wt % based on the weight of the composition, PP is present in an amount of from about 1 wt % to about 25 wt % based on the weight of the composition, PLA is present in an amount of from 0 wt % to about 20 wt % based on the weight of the composition, and the colorant is present in an amount of from 0 wt % to about 10 wt % based on the weight of the composition. In a still further aspect, PET is present in an amount of at least about 82 wt % based on the weight of the composition, PP is present in an amount of from about 5 wt % to about 15 wt % based on the weight of the composition, PLA is present in an amount of from 0 wt % to about 20 wt % based on the weight of the composition, and the colorant is present in an amount of from 0 wt % to about 3 wt % based on the weight of the composition. In yet a further aspect, PET is present in an amount of at least about 85 wt % based on the weight of the composition, PP is present in an amount of from about 5 wt % to about 10 wt % based on the weight of the composition, PLA is present in an amount of from about 1 wt % to about 10 wt % based on the weight of the composition, and the colorant is present in an amount of from about 1 wt % to about 5 wt % based on the weight of the composition. In an even further aspect, PET is present in an amount of at least about 85 wt % based on the weight of the composition, PP is present in an amount of from about 5 wt % to about 10 wt % based on the weight of the composition, PLA is present in an amount of from about 1 wt % to about 5 wt % based on the weight of the composition, and the colorant is present in an amount of from 0 wt % to about 3 wt % based on the weight of the composition.

1. Polyethylene Terephthalate

In various aspects, the compositions of the present invention comprise polyethylene terephthalate (PET). Polyesters such as PET can be prepared by polymerization procedures known in the art sufficient to effect esterification and polycondensation such as, for example, from terephthalic acid and ethylene glycol. PET can also be made using dimethyl terephthalate and ethylene glycol. Polyester melt phase manufacturing processes include direct condensation of a dicarboxylic acid with a diol, optionally in the presence of one or more esterification catalysts, in the esterification zone, followed by polycondensation in the prepolymer and finishing zones in the presence of a polycondensation catalyst; or ester exchange usually in the presence of a transesterification catalyst in the ester exchange zone, followed by prepolymerization and polymerization in the presence of a polycondensation catalyst.

In a further aspect, the polyethylene terephthalate polymer has ethylene terephthalate units in an amount of at least 60 mol %, in an amount of at least 85 mol %, in an amount at least 90 mol %, or in an amount at least 92 mol %, as measured by the mol % of ingredients added to the reaction mixture. Thus, a polyethylene terephthalate polymer may comprise a copolyester of ethylene terephthalate units and other units derived from an alkylene glycol or aryl glycol with an aliphatic or aryl dicarboxylic acid.

Polyethylene terephthalate polymers can be manufactured by reacting a diacid or diester component comprising at least 60 mol % terephthalic acid or a C1-C4 dialkylterephthalate, preferably at least 70 mol %, more preferably at least 85 mol %, even more preferably, at least 90 mol %, and for many applications will be at least 95 mol %, and a diol component comprising at least 60 mol % ethylene glycol, preferably at least 70 mol %, more preferably at least 85 mol %, even more preferably at least 90 mol %, and for many applications, will be at least 95 mol %. It is also preferable that the diacid component is terephthalic acid and the diol component is ethylene glycol. The mole percentage for all of the diacid components totals 100 mol %, and the mole percentage for all of the diol components totals 100 mol %.

Typically, polyesters such as polyethylene terephthalate polymer are made by reacting a glycol with a dicarboxylic acid as the free acid or its dimethyl ester to produce a prepolymer compound which is then polycondensed to produce the polyester. If required, the molecular weight of the polyester can then be increased further by solid state polymerization. In one aspect, after melt phase and/or solid state polycondensation the polyesters have an intrinsic viscosity (It.V.) of at least 0.60 dL/g, and at least 0.70 dL/g measured at 25° C. in a 60/40 ratio by weight of phenol/tetrachloroethane.

Polyethylene terephthalate can be prepared by conventional polymerization procedures well-known in the art sufficient to effect esterification and polycondensation. Polyester polycondensation processes include direct condensation of dicarboxylic acid with the diol, ester interchange, and solid state polymerization methods. Typical polyesterification catalysts which can be used include titanium alkoxides, dibutyl tin dilaruate, and antimony oxide or antimony triacetate, used separately or in combination, optionally with zinc, manganese, or magnesium acetates or benzoates and/or other such catalyst materials as are well known to those skilled in the art. Phosphorus and cobalt compounds may also optionally be present.

For example, a mixture of one or more dicarboxylic acids, preferably aromatic dicarboxylic acids, or ester forming derivatives thereof, and one or more diols may be heated in the presence of esterification and/or transesterification catalysts in an esterification zone, optionally with a polycondensation catalyst, at temperatures in the range of about 150° C. to about 300° C., or alternatively, about 200° C. to about 300° C., and in conventional reactions, typically between about 260° C. to about 300° C., and pressures ranging from atmospheric to about 0.2 mmHg. Normally, the dicarboxylic acid is esterified with the diol(s) at elevated pressure and at a temperature of about 240° C. to about 270° C. Polycondensation reactions are initiated and continued in the melt phase in a prepolymerization zone and finished in the melt phase in a finishing zone, after which polycondensation reactions are continued in the solid state in a solid stating zone. In the prepolymerization zone, molecular weight build up is affected by increasing the temperature from about 260° C. up to about 280° C. and lowering the pressure while excess diol is removed from the mixture. Polycondensation can be continued in a finishing zone in a series of finishing vessels ramped up to higher temperatures until an ItV of about 0.70 dL/g or less is achieved. The catalyst material such as antimony oxide or triacetate may be added to the prepolymerization zone along with phosphorus, cobalt compounds, and colorants, which may optionally be added to the finishing zone. In a typical DMT based process, those skilled in the art recognize that other catalyst material and points of adding the catalyst material and other ingredients vary from a typical direct esterification process.

In a further aspect, PET is present in an amount of at least about 60 wt % based on the weight of the composition. In a still further aspect, PET is present in an amount of at least about 70 wt % based on the weight of the composition. In yet a further aspect, PET is present in an amount of at least about 80 wt % based on the weight of the composition. In an even further aspect, PET is present in an amount of at least about 82.5 wt % based on the weight of the composition. In a still further aspect, PET is present in an amount of at least about 85 wt % based on the weight of the composition. In yet a further aspect, PET is present in an amount of at least about 87.5 wt % based on the weight of the composition. In an even further aspect, PET is present in an amount of at least about 90 wt % based on the weight of the composition.

2. Polymers Comprising a Carbon-Hydrogen Backbone

In various aspects, the compositions of the present invention comprise a first polymer comprising a backbone consisting of carbon and hydrogen. Examples of such polymers include, but are not limited to, polyolefins, and polystyrene.

In a further aspect, the first polymer has been approved for use in one or more of food packaging materials, beverage packaging materials, and drug packaging materials. In a still further aspect, the first polymer has been approved for use in one or more of food packaging materials and beverage packaging materials. In yet a further aspect, the first polymer has been approved for use in food packaging materials. In an even further aspect, the first polymer has been approved for use in beverage packaging materials. In a still further aspect, the first polymer has been approved for use in drug packaging materials.

In a further aspect, the composition further comprises the aliphatic polyester, the aliphatic polyamide, or the polyolefin comprising at least one heteroatom. In a still further aspect, the composition further comprises the aliphatic polyester. In yet a further aspect, the aliphatic polyester is selected from polyglycolide (PGA), polylactic acid (PLA), polycaprolactone, and their copolymers. In an even further aspect, the aliphatic polyester is PLA. In a still further aspect, the composition further comprises the aliphatic polyamide. In yet a further aspect, the composition further comprises the polyolefin comprising at least one heteroatom.

In a further aspect, the first polymer is a polyolefin and the aliphatic polyester is PLA. In a still further aspect, the polyolefin is polypropylene.

In a further aspect, the composition further comprises the second polymer comprising at least one heteroatom selected from nitrogen, oxygen, sulfur, and halogen.

In a further aspect, the first polymer is present in an amount of from about 1 wt % to about 15 wt % based on the weight of the composition. In a still further aspect, the first polymer is present in an amount of from about 2.5 wt % to about 15 wt % based on the weight of the composition. In yet a further aspect, the first polymer is present in an amount of from about 5 wt % to about 15 wt % based on the weight of the composition. In an even further aspect, the first polymer is present in an amount of from about 7.5 wt % to about 15 wt % based on the weight of the composition. In a still further aspect, the first polymer is present in an amount of from about 10 wt % to about 15 wt % based on the weight of the composition. In yet a further aspect, the first polymer is present in an amount of from about 1 wt % to about 12.5 wt % based on the weight of the composition. In an even further aspect, the first polymer is present in an amount of from about 1 wt % to about 10 wt % based on the weight of the composition. In a still further aspect, the first polymer is present in an amount of from about 1 wt % to about 7.5 wt % based on the weight of the composition. In yet a further aspect, the first polymer is present in an amount of from about 1 wt % to about 5 wt % based on the weight of the composition. In an even further aspect, the first polymer is present in an amount of from about 2.5 wt % to about 12.5 wt % based on the weight of the composition. In a still further aspect, the first polymer is present in an amount of from about 5 wt % to about 10 wt % based on the weight of the composition.

a. Polyolefins

Thus, in various aspects, the first polymer is a polyolefin. The polyolefins of the present invention may be described as basically linear, but may optionally contain side chains such as are found, for instance, in conventional, low-density polyethylene. The polyolefin may be a homopolymer or a copolymer of an aliphatic monoolefin, preferably having about 2 to 6 carbon atoms. Examples of polyolefins include, but are not limited to, polyethylene, low-density polyethylene, high-density polyethylene, cross-linked high-density polyethylene, polystyrene, polypropylene, polypropylene copolymer, polymethyl pentene, polyvinyl chloride, polybutylene, polymethylpentene, and polytetrafluoroethylene. Thus, in various aspects, the polyolefin is selected from polyethylene, polypropylene, and polybutylene. In a further aspect, the polyolefin is polypropylene.

In various aspects, the polyolefin is incompatible with PET. Exemplary incompatible polyolefins include, but are not limited to, poly(4-methyl-1-pentene), polyethylene, polypropylene, and polystyrene. In a further aspect, the incompatible polyolefin has a density less than 1.0 g/cm$^3$. In a still further aspect, the incompatible polyolefin has a melting point of less than 140° C. In yet a further aspect, the incompatible polyolefin has a melting point of less than 135° C. In an even further aspect, the incompatible polyolefin has a melting point of about 130° C.

In various aspects, the polyolefin is of a narrow molecular weight distribution. The molecular weight distribution of a polymer is defined by the ratio of the weight average molecular weight (Mw) and the number average molecular weight (Mn) wherein the minimum possible ratio of 1.0 defines the polymer having all the chains the same size. Suitable polyolefins for the composition of the invention may have a number average molecular weight of from about 10,000 to about 400,000, preferably of from about 30,000 to about 50,000 and a ratio of from about 1 to about 9 preferably of from about 2 to about 6, as determined by conventional gel permeation chromatography.

In a further aspect, the polyolefin is present in an amount of from about 1 wt % to about 15 wt % based on the weight of the composition. In a still further aspect, the polyolefin is present in an amount of from about 2.5 wt % to about 15 wt % based on the weight of the composition. In yet a further aspect, the polyolefin is present in an amount of from about 5 wt % to about 15 wt % based on the weight of the composition. In an even further aspect, the polyolefin is present in an amount of from about 7.5 wt % to about 15 wt % based on the weight of the composition. In a still further aspect, the polyolefin is present in an amount of from about 10 wt % to about 15 wt % based on the weight of the composition. In yet a further aspect, the polyolefin is present in an amount of from about 1 wt % to about 12.5 wt % based on the weight of the composition. In an even further aspect, the polyolefin is present in an amount of from about 1 wt % to about 10 wt % based on the weight of the composition. In a still further aspect, the polyolefin is present in an amount of from about 1 wt % to about 7.5 wt % based on the weight of the composition. In yet a further aspect, the polyolefin is present in an amount of from about 1 wt % to about 5 wt % based on the weight of the composition. In an even further aspect, the polyolefin is present in an amount of from about 2.5 wt % to about 12.5 wt % based on the weight of the composition. In a still further aspect, the polyolefin is present in an amount of from about 5 wt % to about 10 wt % based on the weight of the composition.

b. Polystyrene

In various aspects, the first polymer is polystyrene.

In a further aspect, the polystyrene is present in an amount of from about 1 wt % to about 15 wt % based on the weight of the composition. In a still further aspect, the polystyrene is present in an amount of from about 2.5 wt % to about 15 wt % based on the weight of the composition. In yet a further aspect, the polystyrene is present in an amount of from about 5 wt % to about 15 wt % based on the weight of the composition. In an even further aspect, the polystyrene is present in an amount of from about 7.5 wt % to about 15 wt % based on the weight of the composition. In a still further aspect, the polystyrene is present in an amount of from about 10 wt % to about 15 wt % based on the weight of the composition. In yet a further aspect, the polystyrene is present in an amount of from about 1 wt % to about 12.5 wt % based on the weight of the composition. In an even further aspect, the polystyrene is present in an amount of from about 1 wt % to about 10 wt % based on the weight of the composition. In a still further aspect, the polystyrene is present in an amount of from about 1 wt % to about 7.5 wt % based on the weight of the composition. In yet a further aspect, the polystyrene is present in an amount of from about 1 wt % to about 5 wt % based on the weight of the composition. In an even further aspect, the polystyrene is present in an amount of from about 2.5 wt % to about 12.5 wt % based on the weight of the composition. In a still further aspect, the polystyrene is present in an amount of from about 5 wt % to about 10 wt % based on the weight of the composition.

3. Aliphatic Polyesters, Aliphatic Polyamides, and Polyolefins with at Least One Heteroatom In various aspects, the compositions of the present invention comprise an aliphatic polyester, an aliphatic polyamide, or a polyolefin comprising a backbone comprising at least one heteroatom. Examples of aliphatic polyesters include, but are not limited to, polyglycolide (PGA) and polylactic acid (PLA). Thus, in a further aspect, the aliphatic polyester is polyglycolide. In a still further aspect, the aliphatic polyester is polylactic acid. Examples of aliphatic polyamides include, but are not limited to, dimethylformamide and N-methyl-2-pyrrolidone. Thus, in a further aspect, the aliphatic polyamide is dimethylformamide. In a still further aspect, the aliphatic polyamide is N-methyl-2-pyrrolidone. Examples of polyolefins comprising a backbone comprising at least one heteroatom include, but are not limited to, polyvinyl chloride. Thus, in a further aspect, the polyolefin comprising a backbone comprising at least one heteroatom is polyvinyl chloride.

In a further aspect, the aliphatic polyester, the aliphatic polyamide, or the polyolefin has been approved for use in one or more of food packaging materials, beverage packaging materials, and drug packaging materials. In a still further aspect, the aliphatic polyester, the aliphatic polyamide, or the polyolefin has been approved for use in one or more of food packaging materials and beverage packaging materials. In yet a further aspect, the aliphatic polyester, the aliphatic polyamide, or the polyolefin has been approved for use in food packaging materials. In an even further aspect, the aliphatic polyester, the aliphatic polyamide, or the polyolefin has been approved for use in beverage packaging materials. In a still further aspect, the aliphatic polyester, the aliphatic polyamide, or the polyolefin has been approved for use in drug packaging materials.

In a further aspect, the composition further comprises first polymer comprising a backbone consisting of carbon and hydrogen. In a still further aspect, the first polymer is selected from a polyolefin and polystyrene. In yet a further aspect, the first polymer is a polyolefin. In an even further aspect, the polyolefin is selected from polyethylene, polypropylene, and polybutylene. In a still further aspect, the polyolefin is polypropylene. In yet a further aspect, the first polymer is a polyolefin and the aliphatic polyester is PLA. In an even further aspect, the polyolefin is polypropylene and the aliphatic polyester is PLA. In a still further aspect, the first polymer is polystyrene.

In a further aspect, the composition further comprises the second polymer comprising at least one heteroatom selected from nitrogen, oxygen, sulfur, and halogen.

In a further aspect, the aliphatic polyester, the aliphatic polyamide, or the polyolefin is present in an amount of from about 1 wt % to about 15 wt % based on the weight of the composition. In a still further aspect, the aliphatic polyester, the aliphatic polyamide, or the polyolefin is present in an amount of from about 2.5 wt % to about 15 wt % based on the weight of the composition. In yet a further aspect, the aliphatic polyester, the aliphatic polyamide, or the polyolefin is present in an amount of from about 5 wt % to about 15 wt % based on the weight of the composition. In an even further aspect, the aliphatic polyester, the aliphatic polyamide, or the polyolefin is present in an amount of from about 7.5 wt % to about 15 wt % based on the weight of the composition. In a still further aspect, the aliphatic polyester, the aliphatic polyamide, or the polyolefin is present in an amount of from about 10 wt % to about 15 wt % based on the weight of the composition. In yet a further aspect, the aliphatic polyester, the aliphatic polyamide, or the polyolefin is present in an amount of from about 1 wt % to about 12.5 wt % based on the weight of the composition. In an even further aspect, the aliphatic polyester, the aliphatic polyamide, or the polyolefin is present in an amount of from about 1 wt % to about 10 wt % based on the weight of the composition. In a still further aspect, the aliphatic polyester, the aliphatic polyamide, or the polyolefin is present in an amount of from about 1 wt % to about 7.5 wt % based on the weight of the composition. In yet a further aspect, the aliphatic polyester, the aliphatic polyamide, or the polyolefin is present in an amount of from about 1 wt % to about 5 wt % based on the weight of the composition. In an even further aspect, the aliphatic polyester, the aliphatic polyamide, or the polyolefin is present in an amount of from about 2.5 wt % to about 12.5 wt % based on the weight of the composition. In a still further aspect, the aliphatic polyester, the aliphatic polyamide, or the polyolefin is present in an amount of from about 5 wt % to about 10 wt % based on the weight of the composition.

a. Polylactic Acid

In various aspects, the aliphatic polyester is polylactic acid (PLA). The PLA may be a crystalline PLA or an amorphous PLA or a combination thereof.

In various aspects, the polylactic acid is a crystalline polylactic acid. As described in U.S. Pat. No. 6,005,068, lactic acid has two optical isomers: L-lactic acid (also known as (S)-lactic acid) and D-lactic acid (also known as (R)-lactic acid). Three forms of lactide can be derived from these lactic acid isomers: L,L-lactide (also known as L-lactide) and which includes two L-lactic acid residuals; D,D-lactide (also known as D-lactide) and which includes two D-lactic acid residuals; and meso-lactide which includes one each of L and D-lactic acid residuals. The degree of crystallinity is determined by relatively long sequences of a particular residual, either long sequences of L- or of D-lactic acid. The length of interrupting sequences helps to establish the degree of crystallinity (or amorphous) and other polymer features such as crystallization rate, melting point, or melt processability. Examples of crystalline PLA include, but are not limited to, Natureworks® Ingeo™ 4042D and 4032D.

In various aspects, the polylactic acid is an amorphous PLA resin. Without wishing to be bound by theory, the addition of amorphous PLA can help to lower extrusion polymer pressure and, in terms of film manufacturing, can help to reduce or slow the crystallization rate of the newly oriented film. This may aid in the orientation of the PLA film and may reduce defects such as, for example, uneven stretch marks.

In a further aspect, PLA is present in an amount of from about 0.01 wt % to about 20 wt % based on the weight of the composition. In a still further aspect, PLA is present in an amount of from about 0.05 wt % to about 20 wt % based on the weight of the composition. In yet a further aspect, PLA is present in an amount of from about 0.1 wt % to about 20 wt % based on the weight of the composition. In an even further aspect, PLA is present in an amount of from about 0.5 wt % to about 20 wt % based on the weight of the composition. In a still further aspect, PLA is present in an amount of from about 1 wt % to about 20 wt % based on the weight of the composition. In yet a further aspect, PLA is present in an amount of from about 0.01 wt % to about 15 wt % based on the weight of the composition. In an even further aspect, PLA is present in an amount of from about 0.01 wt % to about 10 wt % based on the weight of the composition. In a still further aspect, PLA is present in an amount of from about 0.01 wt % to about 5 wt % based on the weight of the composition. In yet a further aspect, PLA is present in an amount of from about 0.05 wt % to about 15 wt % based on the weight of the composition. In an even further aspect, PLA is present in an amount of from about 0.1 wt % to about 10 wt % based on the weight of the composition. In a still further aspect, PLA is present in an amount of from about 1 wt % to about 7.5 wt % based on the weight of the composition. In yet a further aspect, PLA is present in an amount of from about 1 wt % to about 5 wt % based on the weight of the composition.

4. Polymers Comprising at Least One Heteroatom

In various aspects, the compositions of the present invention comprise a second polymer comprising at least one heteroatom selected from nitrogen, oxygen, sulfur, and halogen. In a further aspect, the second polymer comprises at least one heteroatom selected from nitrogen, oxygen, sulfur, bromine, fluorine, and chlorine. In a still further aspect, the second polymer comprises at least one heteroatom selected from nitrogen, oxygen, sulfur, and chlorine. In yet a further aspect, the second polymer comprises at least one heteroatom selected from nitrogen, oxygen, and sulfur. In an even further aspect, the second polymer comprises at least one heteroatom selected from nitrogen and oxygen. In a still further the second polymer comprises at least one nitrogen atom. In yet a further aspect, the second polymer comprises at least one oxygen atom. In an even further aspect, the second polymer comprises at least one sulfur atom. In a still further aspect, the second polymer comprises at least one halogen atom. In yet a further aspect, the second polymer comprises at least one bromine atom. In an even further aspect, the second polymer comprises at least one chlorine atom. In a still further aspect, the second polymer comprises at least one fluorine atom.

Examples of such polymers include, but are not limited to, polythiophene and polypyrrole. Thus, in a further aspect, the second polymer is polythiophene. In a still further aspect, the second polymer is polypyrrole.

In various aspects, the second polymer is a polycarbonate. In a further aspect, the polycarbonate is derived from a bisphenol. Thus, examples of polycarbonates include, but are not limited to, homopolycarbonates derived from a bisphenol; copolycarbonates derived from more than one bisphenol; and copolymers derived from one or more bisphenols and comprising one or more aliphatic ester units or aromatic ester units or siloxane units.

In a further aspect, the polycarbonate is a 4,4'-dihydroxydiarylalkane polycarbonate. In a still further aspect, the 4,4'-dihydroxydiarylalkane polycarbonate is selected from bisphenol-A-based polycarbonate, bisphenol-S based polycarbonate, biphenyl-based polycarbonate.

In a further aspect, the second polymer has been approved for use in one or more of food packaging materials, beverage packaging materials, and drug packaging materials. In a still further aspect, the second polymer has been approved for use in one or more of food packaging materials and beverage packaging materials. In yet a further aspect, the second polymer has been approved for use in food packaging materials. In an even further aspect, the second polymer has been approved for use in beverage packaging materials. In a still further aspect, the second polymer has been approved for use in drug packaging materials.

In a further aspect, the composition further comprises the first polymer comprising a backbone consisting of carbon and hydrogen. In a still further aspect, the first polymer is selected from a polyolefin and polystyrene. In yet a further aspect, the first polymer is a polyolefin. In an even further aspect, the polyolefin is selected from polyethylene, polypropylene, and polybutylene. In a still further aspect, the polyolefin is polypropylene. In yet a further aspect, the first polymer is polystyrene.

In a further aspect, the composition further comprises the aliphatic polyester, the aliphatic polyamide, or the polyolefin comprising at least one heteroatom. In a still further aspect, the composition further comprises the aliphatic polyester. In yet a further aspect, the aliphatic polyester is selected from polyglycolide (PGA) and polylactic acid (PLA). In an even further aspect, the aliphatic polyester is PLA. In a still further aspect, the composition further comprises the aliphatic polyamide. In yet a further aspect, the composition further comprises the polyolefin comprising at least one heteroatom.

In a further aspect, the second polymer is present in an amount of from about 1 wt % to about 15 wt % based on the weight of the composition. In a still further aspect, the second polymer is present in an amount of from about 2.5 wt % to about 15 wt % based on the weight of the composition. In yet a further aspect, the second polymer is present in an amount of from about 5 wt % to about 15 wt % based on the weight of the composition. In an even further aspect, the second polymer is present in an amount of from about 7.5 wt % to about 15 wt % based on the weight of the composition. In a still further aspect, the second polymer is present in an amount of from about 10 wt % to about 15 wt % based on the weight of the composition. In yet a further aspect, the second polymer is present in an amount of from about 1 wt % to about 12.5 wt % based on the weight of the composition. In an even further aspect, the second polymer is present in an amount of from about 1 wt % to about 10 wt % based on the weight of the composition. In a still further aspect, the second polymer is present in an amount of from about 1 wt % to about 7.5 wt % based on the weight of the composition. In yet a further aspect, the second polymer is present in an amount of from about 1 wt % to about 5 wt % based on the weight of the composition. In an even further aspect, the second polymer is present in an amount of from about 2.5 wt % to about 12.5 wt % based on the weight of the composition. In a still further aspect, the second polymer is present in an amount of from about 5 wt % to about 10 wt % based on the weight of the composition.

5. Colorants

In various aspects, the compositions of the present invention comprise a colorant. Examples of colorants include, but are not limited to, carbon black, grey colorant, amber colorant, blue colorant, white colorant, opaque colorant, translucent colorant, infrared absorbing colorant (e.g., carbon black or activated carbon), and highly reflective colorant (e.g., titanium dioxide). Thus, in various aspects, the colorant is selected from a white colorant, an opaque colorant, and a translucent colorant.

In a further aspect, the colorant is present in an amount of from about 0.01 wt % to about 10 wt % based on the weight of the composition. In a still further aspect, the colorant is present in an amount of from about 0.05 wt % to about 10 wt % based on the weight of the composition. In yet a further aspect, the colorant is present in an amount of from about 0.1 wt % to about 10 wt % based on the weight of the composition. In an even further aspect, the colorant is present in an amount of from about 0.5 wt % to about 10 wt % based on the weight of the composition. In a still further aspect, the colorant is present in an amount of from about 1 wt % to about 10 wt % based on the weight of the composition. In yet a further aspect, the colorant is present in an amount of from about 0.01 wt % to about 7 wt % based on the weight of the composition. In an even further aspect, the colorant is present in an amount of from about 0.01 wt % to about 5 wt % based on the weight of the composition. In a still further aspect, the colorant is present in an amount of from about 0.01 wt % to about 3 wt % based on the weight of the composition. In yet a further aspect, the colorant is present in an amount of from about 0.05 wt % to about 7 wt % based on the weight of the composition. In an even further aspect, the colorant is present in an amount of from about 0.1 wt % to about 5 wt % based on the weight of the composition. In a still further aspect, the colorant is present in an amount of from about 0.5 wt % to about 5 wt % based on the weight of the composition. In yet a further aspect, the colorant is present in an amount of from about 1 wt % to about 3 wt % based on the weight of the composition.

In a further aspect, the colorant comprises a calcium-based colorant. In a still further aspect, the colorant comprises a titanium-based colorant. In yet a further aspect, the colorant comprises titanium dioxide.

6. Optional Components

Other components can be added to the polymer blend composition to enhance the performance properties. For example, crystallization aids, impact modifiers, surface lubricants, denesting agents, stabilizers, antioxidants, ultraviolet light absorbing agents, metal deactivators (e.g., cobalt), colorants, nucleating agents, acetaldehyde reducing compounds, other reheat rate enhancing aids such as elemental antimony or reduced antimony, carbon black, graphite, black iron oxide, red iron oxide and the like, sticky bottle additives such as talc, and fillers and the like can be included. The resin may also contain small amounts of branching agents such as trifunctional or tetrafunctional comonomers such as trimellitic anhydride, trimethylol propane, pyromellitic dianhydride, pentaerythritol, and other polyester forming polyacids or polyols generally known in the art. All of these additives and many others and their use are well known in the art and do not require extensive discussion.

7. Properties

In various aspects, the polymer blend compositions of the invention can have various properties that provide the superior function of the compositions, including reduced water vapor transmission rate, reduced density, and improved visual appearance. It is also understood that the polymer blend compositions have other properties.

i. Water Vapor Transmission Rate

The moisture barrier can be expressed in terms of the water vapor transmission rate (WVTR). The WVTR of the compositions of the present invention can be measured, for example, using 21CFR Part 11, ASTM F1249 Plastic Test Standard.

Thus, in various aspects, the composition has a water vapor transmission rate that is lower than PET in the absence of the polyolefin. In a still further aspect, the water vapor transmission rate is at least 5% lower than PET in the absence of the polyolefin. In yet a further aspect, the water vapor transmission rate is at least 10% lower than PET in the absence of the polyolefin. In an even further aspect, the water vapor transmission rate is at least 15% lower than PET in the absence of the polyolefin. In a still further aspect, the water vapor transmission rate is at least 20% lower than PET in the absence of the polyolefin. In yet a further aspect, the water vapor transmission rate is at least 30% lower than PET in the absence of the polyolefin.

Thus, in various aspects, the composition has a water vapor transmission rate that is lower than PET in the absence of PLA. In a still further aspect, the water vapor transmission rate is at least 5% lower than PET in the absence of PLA. In yet a further aspect, the water vapor transmission rate is at least 10% lower than PET in the absence of PLA. In an even further aspect, the water vapor transmission rate is at least 15% lower than PET in the absence of PLA. In a still further aspect, the water vapor transmission rate is at least 20% lower than PET in the absence of PLA. In yet a further aspect, the water vapor transmission rate is at least 30% lower than PET in the absence of PLA.

In a further aspect, the reference composition comprises an inorganic colorant.

ii. Density

In various aspects, the composition exhibits a density that is less than the density of a PET reference composition, wherein the reference composition exhibits the same transmittance, and wherein the reference composition does not comprise the first polymer, the second polymer, the aliphatic polyester, the aliphatic polyamide, or the polyolefin. In a further aspect, the compositions of the present invention exhibit a density that is less than the density of a PET reference composition, wherein the reference composition exhibits the same transmittance, and wherein the reference composition does not comprise a polyolefin. In a still further aspect, the compositions of the present invention exhibit a density that is less than the density of a PET reference composition, wherein the reference composition exhibits the same transmittance, and wherein the reference composition does not comprise a PLA component. Therefore, without wishing to be bound by theory, articles, container walls, and preforms formed from the disclosed compositions can be lighter than articles, container walls, and preforms prepared from said PET reference compositions. Suitable methods of determining the density of polymer blends include, for example, calculating the sum of the densities of the mass fractional densities of each polymer component and would be understood by one of ordinary skill in the art.

In a further aspect, the density is at least 1% less than the density of the reference composition. In a still further aspect, the density is at least 2% less than the density of the reference composition. In yet a further aspect, the density is at least 3% less than the density of the reference composition. In an even further aspect, the density is at least 4% less than the density of the reference composition. In a still further aspect, the density is at least 5% less than the density of the reference composition. In yet a further aspect, the density is at least 6% less than the density of the reference composition. In an even further aspect, the density is at least 7% less than the density of the reference composition. In a still further aspect, the density is at least 8% less than the density of the reference composition. In yet a further aspect, the density is at least 9% less than the density of the reference composition. In an even further aspect, the density is at least 10% less than the density of the reference composition.

In a further aspect, the reference composition comprises an inorganic colorant.

iii. Visual Appearance

The clarity of the composition can be expressed in terms of the transmittance. Thus, in various aspects, the composition has a transmittance that is lower than PET in the absence of the polyolefin. In a still further aspect, the transmittance is between about 400 nm and about 800 nm. In yet a further aspect, the transmittance is at least 90% lower than PET in the absence of the polyolefin. In various aspects, the composition has a transmittance that is lower than PET in the absence of PLA. In a still further aspect, the transmittance is at least 80% lower than PET in the absence of PLA.

In various aspects, articles, container walls, and/or preforms prepared from the disclosed compositions have an improved visual appearance compared to articles, container walls, and/or preforms prepared from compositions comprising PET in the absence of a polyolefin. In a further aspect, articles, container walls, and/or preforms prepared from the disclosed compositions have an improved visual appearance compared to articles, container walls, and/or preforms prepared from compositions comprising PET in the absence of PLA. For example, the appearance may be less dull. Alternatively, the appearance may be more metallic.

C. Methods of Making a Polymer Blend Composition

In one aspect, the invention relates to methods of making polymer blend compositions, the method comprising the step of combining polyethylene terephthalate (PET) and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups; under conditions effective to provide a light barrier composition; wherein the transmittance of the compositions is less than about 1.5% at a wavelength of from about 400 nm to about 700 nm.

In one aspect, the invention relates to methods of making polymer blend compositions, the method comprising the step of combining: (a) polyethylene terephthalate; and (b) PP; under conditions effective to provide a light barrier composition; wherein the transmittance of the compositions is less than about 1.5% at a wavelength of from about 400 nm to about 700 nm.

In one aspect, the invention relates to methods of making polymer blend compositions, the method comprising the step of combining: (a) polyethylene terephthalate; and (b) PLA; under conditions effective to provide a light barrier composition; wherein the transmittance of the compositions is less than about 1.5% at a wavelength of from about 400 nm to about 700 nm.

In a further aspect, conditions effective to provide can comprise adjusting the temperature of one or more of the components.

In a further aspect, conditions effective to provide can comprise evaporating a liquid or solvent. In a still further aspect, the method can comprise agitation or sparging. For example, and without limitation, a suspension of polyethylene terephthalate and polypropylenecan be subjected to agitation and evaporation to provide the desired final composition. In a further example, a suspension of polyethylene terephthalate and PLA can be subjected to agitation and evaporation to provide the desired final composition.

In various aspects, the methods can comprise at least one extruding step. In a further aspect, the methods can comprise the step of extruding a component or composition. For example, and without limitation, the polypropylene can be subjected to an extrusion step with the PET. In another aspect, the polyolefin can be subjected to the first extrusion step, with for example, a carrier. In a further aspect, the polyolefin can then be subjected to a second extrusion step with the PET. In some aspects, the at least one extrusion step is in the presence of a binder. In other aspects, the at least one extrusion step is in the absence of a binder. Without wishing to be bound by theory, other components can be subjected to an extrusion step with PET as well.

In one aspect, the PLA is subjected to an extrusion step with the PET. In another aspect, the PLA is subjected to the first extrusion step, with for example, a carrier. In a further aspect, the PLA is then subjected to a second extrusion step with the PET. In some aspects, the at least one extrusion step is in the presence of a binder. In other aspects, the at least one extrusion step is in the absence of a binder.

In a further aspect, the composition is extruded with a size less than about 5.0 mm screen size. In a yet further aspect, the composition is extruded with a size less than about 4.0 mm screen size. In an even further aspect, the composition is extruded with a size less than about 3.0 mm screen size. In a still further aspect, the composition is extruded with a size less than about 2.0 mm screen size. In a yet further aspect, the composition is extruded with a size less than about 1.0 mm screen size. In an even further aspect, the composition is extruded with a size less than about 0.5 mm screen size.

In a further aspect, the method can comprise the step of milling. In a still further aspect, the method can further comprise the step of milling the composition following the step of extrusion. In a yet further aspect, the composition is milled to a size less than about 5.0 mm screen size. In a still further aspect, the composition is milled to a size less than about 4.0 mm screen size. In an even further aspect, the composition is milled to a size less than about 3.0 mm screen size. In a still further aspect, the composition is milled to a size less than about 2.0 mm screen size. In a yet further aspect, the composition is milled to a size less than about 1.0 mm screen size. In an even further aspect, the composition is milled to a size less than about 0.5 mm screen size.

In a further aspect, the method further comprises the step of pulverizing a component or composition. In a yet further aspect, the composition is pulverized to a size less than about 5.0 mm screen size. In a still further aspect, the composition is pulverized to a size less than about 4.0 mm screen size. In an even further aspect, the composition is pulverized to a size less than about 3.0 mm screen size. In a still further aspect, the composition is pulverized to a size less than about 2.0 mm screen size. In a yet further aspect, the composition is pulverized to a size less than about 1.0 mm screen size. In an even further aspect, the composition is pulverized to a size less than about 0.5 mm screen size.

In various aspects, the method can comprise at least one heating step. In some aspects, the heating step can comprise a drying step. In other aspects, the heating step can comprise the step of heating the composition to remove harmful or unwanted side products, for example, side products that can interfere with light barrier performance.

In a further aspect, the method further comprises the step of heating the composition following the step of milling. In an even further aspect, the method further comprises the step of heating the composition following the step of pulverizing. In a yet further aspect, the method further comprises the step of heating the composition following the step of extrusion. In a still further aspect, the heating can be in an atmosphere of dried air or other inert gas, such as nitrogen, and if desired, under sub-atmospheric pressure.

In a further aspect, the method further comprises the step of drying the composition following the step of milling. In an even further aspect, the method further comprises the step of drying the composition following the step of pulverizing. In a yet further aspect, the method further comprises the step of drying the composition following the step of extrusion. In a still further aspect, the drying can be in an atmosphere of dried air or other inert gas, such as nitrogen, and if desired, under sub-atmospheric pressure.

The extrusion step can be accomplished by a variety of extrusion or compounding methods known in the art. Any suitable equipment designed to melt the components, to combine the components, and to mix the components may be used. Alternatively, the functions may be performed in more than one piece of equipment. This may be in continuous or batch processes. Example of equipment that may be used include, but are not limited to, two-roll mills, two rotor mixers with open mixing chambers, internal mixers with a single rotor, internal mixers with multiple counter rotating rotors, internal mixers with multiple co-rotating rotors, internal mixers with multiple mixing chambers, single screw extruders, planetary screw extruders, co-rotating twin screw extruders, counter rotating twin screw extruders conical extruders, and the like. These mixing devices are well known in the art.

Alternatively, the components may also be mixed using static mixers in which the mixing elements are stationary and the mixing is accomplished by multiple reorientations of a mixture containing components as it flows through the static elements, or may be mixed in stirred vessels.

D. Methods of Making an Article

In one aspect, the invention relates to methods of making an article, the method comprising the steps of: (1) combining polyethylene terephthalate and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups; wherein the transmittance is less than about 1.5% at a wavelength of from about 400 nm to about 700 nm; (2) forming a melt; and (3) extruding the melt, thereby forming the article.

In one aspect, the invention relates to methods of making an article, the method comprising the steps of: (1) combining polyethylene terephthalate with PP; wherein the transmittance is less than about 1.5% at a wavelength of from about 400 nm to about 700 nm; (2) forming a melt; and (3) extruding the melt, thereby forming the article.

In one aspect, the invention relates to methods of making an article, the method comprising the steps of: (1) combining polyethylene terephthalate with PLA; wherein the transmittance is less than about 1.5% at a wavelength of from about 400 nm to about 700 nm; (2) forming a melt; and (3) extruding the melt, thereby forming the article.

In a further aspect, extrusion is injection molding. In a still further aspect, extrusion is sheet or film extrusions. In a yet further aspect, the article is a preform. In an even further aspect, the article is a bottle.

In a further aspect, the method further comprises addition of one or more additives selected from colorants, acetaldehyde scavengers, reheat agents, UV absorbers or inhibitors, stabilizers, thermal stabilizers, and nonionic colorant harmonizers. In a still further aspect, the additive is a visually effective amount of colorant in the melt processing zone. In a yet further aspect, the additive is a nonionic colorant harmonizer in an amount of from about 0.010 to about 10 weight percent in the melt processing zone. In a yet further aspect, the nonionic colorant harmonizer is an aliphatic ester having 6 to 24 carbons.

In a further aspect, the method further comprises a first stream comprising the PET to a melt processing zone for making the article, a second stream comprising a polyolefin, and optionally a third stream comprising other additives such as colorant, acetaldehyde scavengers, reheat agents, UV absorbers or inhibitors, stabilizers, thermal stabilizers; and wherein first, second and optional third streams are fed to a melt processing zone for making the article.

In a further aspect, the method further comprises a first stream comprising the PET to a melt processing zone for making the article, a second stream comprising PLA, and optionally a third stream comprising other additives such as colorant, acetaldehyde scavengers, reheat agents, UV absorbers or inhibitors, stabilizers, thermal stabilizers; and wherein first, second and optional third streams are fed to a melt processing zone for making the article.

For example, and without limitation, PET and polypropylene can be combined in the melt processing zone as individual streams or as pellet/pellet dry blends, or as combinations thereof. In a still further aspect, PET and PLA can be combined in the melt processing zone as individual streams or as pellet/pellet dry blends, or as combinations thereof. Without wishing to be bound by theory, other components can also be combined in the melt processing zone as detailed above. Thus, there is provided a process for the manufacture of a preform comprising combining PET and polypropylene, or combining PET and PLA, or combining any other components, into a melt processing zone, forming a melt, and forming an article directly from the melt.

In a yet further aspect, a blend comprising PET and polypropylene, or PET and PLA, can be simultaneously dried in a drying zone, under conditions effective to at least partially remove moisture from the blend. In an apparatus containing a drying zone, radiant or convective heat, or electromagnetic or microwave radiation, or any other source for removal of moisture, is emitted from a drying zone or is passed through at least a portion of the mechanical drying zone and contacts the particle blend to remove at least a portion of surface and/or internal water moisture. Without wishing to be bound by theory, other components can be simultaneously dried in a drying zone with PET as well.

The articles obtained by the concentrates of the invention may be extruded products such as sheets and fibers, or injection molded articles such as bottle preforms and other shapes. In a preferred embodiment, the articles produced from the melt processing zone are the preforms, sheets, and trays for packaging food and beverages.

E. Articles

Various articles can be prepared from the disclosed compositions. Thus, the articles prepared from the compositions will also have the composition present in the article. Suitable articles include vessels and films, such as flexible sheet films, flexible bags, pouches, semi-rigid and rigid containers such as bottles (e.g., PET bottles), metal cans, or plastic cans, or combinations thereof. Typical flexible films and bags include those used to package various food items and can be made up of one or a multiplicity of layers to form the overall film or bag-like packaging material. The composition of the present invention can be used in one, some or all of the layers of such packaging material.

Specific articles include preforms, containers and films for packaging of food, beverages, cosmetics, pharmaceuticals, and personal care products where a light barrier is needed. Examples of beverage containers are bottles for holding milk, and the invention is particularly useful in bottle applications containing dairy products or any other beverage where light detrimentally affects the flavor, fragrance, performance (e.g., vitamin degradation), or color of the product. The compositions are also particularly useful as a sheet for thermoforming into rigid packages and films for flexible structures. Rigid packages include food trays and lids. Examples of food tray applications include dual ovenable food trays, or cold storage food trays, both in the base container and in the lidding (whether a thermoformed lid or a film), where the freshness of the food contents can decay with the ingress of light.

Other suitable articles include rigid or semi-rigid articles including plastic, such as those utilized for dairy products, as well as thermoformed trays or cup normally having thickness in the range of from 100 to 1000 micrometers. The walls of such articles can comprise single or multiple layers of materials. The article can also take the form of a bottle or can, or a crown, cap, crown or cap liner, plastisol or gasket. The composition of the present invention can be used as an integral layer or portion of, or as an external or internal coating or liner of, the formed semi-rigid or rigid packaging article. As a liner, the composition can be extruded as a film along with the rigid article itself, e.g., by coextrusion, extrusion coating, or an extrusion lamination process, so as to form the liner in situ during article production; or alternatively can be adhered by heat and/or pressure, by adhesive, or by any other suitable method.

The articles can be made by various methods known in the art. Generally, the articles are prepared by melt processing methods (i.e., a melt of the composition). Such processes generally include injection molding, stretch blow molding, extrusion, thermoforming, extrusion blow molding, and (specifically for multilayer structures) coextrusion and lamination using adhesive tie layers. Orientation, e.g., by stretch blow molding, of the polymer can be used with phthalate polyesters because of the known mechanical advantages that result.

The melt processing zone for making the article can be operated under customary conditions effective for making the intended articles, such as preforms, bottles, trays, and other articles mentioned above. In one aspect, such conditions are effective to process the melt without substantially increasing the intrinsic viscosity of the melt and which are ineffective at promoting transesterification reactions. In some preferred aspects, suitable operating conditions effective to establish a physical blend of the base polymer, oxidizable organic component, and transition metal are temperatures in the melt processing zone within a range of about 250° C. to about 300° C. at a total cycle time of less than about 6 minutes, and typically without the application of vacuum and under a positive pressure ranging from about 0 psig (pound-force per square inch gauge) to about 900 psig. In some embodiments, the residence time of the melt on the screw can range from about 1 to about 4 minutes.

In a further aspect, the article is molded. In a still further aspect, the article is blow molded.

In a further aspect, the article is a bottle. In a still further aspect, the article is a can.

In a further aspect, the article is a packaging material. In a still further aspect, the packaging material is selected from a film and a sheet.

F. Container Walls

In one aspect, the invention relates to a wall of a container comprising at least one layer, wherein the layer comprises a composition comprising polyethylene terephthalate (PET) and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups.

In one aspect, the invention relates to a wall of a container comprising at least one layer, wherein the layer comprises a composition comprising: (a) polyethylene terephthalate (PET); and (b) polypropylene (PP).

In one aspect, the invention relates to a wall of a container comprising at least one layer, wherein the layer comprises a composition comprising: (a) polyethylene terephthalate (PET); and (b) polylactic acid (PLA).

In a further aspect, the first polymer is selected from a polyolefin and polystyrene. In a still further aspect, the first polymer is a polyolefin. In yet a further aspect, the polyolefin is selected from polyethylene, polypropylene, and polybutylene. In an even further aspect, the polyolefin is polypropylene. In a still further aspect, the polyolefin is polystyrene.

In a further aspect the aliphatic polyester is selected from polyglycolide and polylactic acid. In a still further aspect, the aliphatic polyester is polyglycolide. In yet a further aspect, the aliphatic polyester is polylactic acid.

In a further aspect, the composition comprises a polyolefin. Examples of polyolefins include, but are not limited to, polyethylene, low-density polyethylene, high-density polyethylene, cross-linked high-density polyethylene, polyketone, polypropylene, polypropylene copolymer, polymethyl pentene, polyvinyl chloride, polybutylene, polymethylpentene, and polytetrafluoroethylene. Thus, in various aspects, the polyolefin is selected from polyethylene, polypropylene, and polybutylene. In a further aspect, the polyolefin is polypropylene.

In a further aspect, the composition further comprises polylactic acid. In a still further aspect, the PLA may be a crystalline PLA, an amorphous PLA, or a combination thereof.

In a further aspect, the composition further comprises a colorant. Examples of colorants include, but are not limited to, carbon black, grey colorant, amber colorant, blue colorant, white colorant, opaque colorant, translucent colorant, infrared absorbing colorant (e.g., carbon black or activated carbon), and highly reflective colorant (e.g., titanium dioxide). Thus, in various aspects, the colorant is selected from a white colorant, an opaque colorant, and a translucent colorant.

In a further aspect, the composition has a transmittance of less than about 1.5% at a wavelength of from about 400 nm to about 700 nm. In a still further aspect, the composition has a transmittance of less than about 0.5% at a wavelength of from about 500 nm to about 600 nm.

In a further aspect, the composition has a water vapor transmission rate that is lower than PET in the absence of one or more of: (a) the a first polymer comprising a backbone consisting of carbon and hydrogen; (b) the aliphatic polyester, the aliphatic polyamide, or the polyolefin comprising a backbone comprising at least one heteroatom; or (c) the second polymer comprising at least one heteroatom selected from nitrogen, oxygen, sulfur, and halogen, wherein the polymer does not consist essentially of ester, thioester, or amide groups. In a still further aspect, the water vapor transmission rate is at least 20% lower. In yet a further aspect, the water vapor transmission rate is at least 30% lower.

In a further aspect, the composition has a water vapor transmission rate that is lower than PET in the absence of PP. In a still further aspect, the water vapor transmission rate is at least 20% lower than PET in the absence of PP. In yet a further aspect, the water vapor transmission rate is at least 30% lower than PET in the absence of PP.

In a further aspect, the composition has a water vapor transmission rate that is lower than PET in the absence of PLA. In a still further aspect, the water vapor transmission rate is at least 20% lower than PET in the absence of PLA. In yet a further aspect, the water vapor transmission rate is at least 30% lower than PET in the absence of PLA.

G. Preforms

In one aspect, the invention relates to preforms comprising at least one layer, wherein the layer comprises a composition comprising polyethylene terephthalate (PET) and one or more of: (a) a first polymer comprising a backbone consisting of carbon and hydrogen; (b) an aliphatic polyester, an aliphatic polyamide, or a polyolefin comprising a backbone comprising at least one heteroatom; or (c) a second polymer comprising at least one heteroatom selected from nitrogen, oxygen, sulfur, and halogen, wherein the polymer does not consist essentially of ester, thioester, or amide groups.

In one aspect, the invention relates to preforms comprising at least one layer, wherein the layer comprises a composition comprising: (a) polyethylene terephthalate (PET); and (b) polylpropylene (PP).

In one aspect, the invention relates to preforms comprising at least one layer, wherein the layer comprises a composition comprising: (a) polyethylene terephthalate (PET); and (b) polylactic acid (PLA).

In a further aspect, the first polymer is selected from a polyolefin and polystyrene. In a still further aspect, the first polymer is a polyolefin. In yet a further aspect, the polyolefin is selected from polyethylene, polypropylene, and polybutylene. In an even further aspect, the polyolefin is polypropylene. In a still further aspect, the polyolefin is polystyrene.

In a further aspect the aliphatic polyester is selected from polyglycolide and polylactic acid. In a still further aspect, the aliphatic polyester is polyglycolide. In yet a further aspect, the aliphatic polyester is polylactic acid.

In a further aspect, the composition comprises a polyolefin. Examples of polyolefins include, but are not limited to, polyethylene, low-density polyethylene, high-density polyethylene, cross-linked high-density polyethylene, polyketone, polypropylene, polypropylene copolymer, polymethyl pentene, polyvinyl chloride, polybutylene, polymethylpentene, and polytetrafluoroethylene. Thus, in various aspects, the polyolefin is selected from polyethylene, polypropylene, and polybutylene. In a further aspect, the polyolefin is polypropylene.

In a further aspect, the composition further comprises polylactic acid. In a still further aspect, the PLA may be a crystalline PLA, an amorphous PLA, or a combination thereof.

In a further aspect, the composition further comprises a colorant. Examples of colorants include, but are not limited to, carbon black, grey colorant, amber colorant, blue colorant, white colorant, opaque colorant, translucent colorant, infrared absorbing colorant (e.g., carbon black or activated carbon), and highly reflective colorant (e.g., titanium dioxide). Thus, in various aspects, the colorant is selected from a white colorant, an opaque colorant, and a translucent colorant.

In a further aspect, the composition has a transmittance of less than about 1.5% at a wavelength of from about 400 nm to about 700 nm. In a still further aspect, the composition has a transmittance of less than about 0.5% at a wavelength of from about 500 nm to about 600 nm.

In a further aspect, the composition has a water vapor transmission rate that is lower than PET in the absence of one or more of: (a) the a first polymer comprising a backbone consisting of carbon and hydrogen; (b) the aliphatic polyester, the aliphatic polyamide, or the polyolefin comprising a backbone comprising at least one heteroatom; or (c) the second polymer comprising at least one heteroatom selected from nitrogen, oxygen, sulfur, and halogen, wherein the polymer does not consist essentially of ester, thioester, or amide groups. In a still further aspect, the water vapor transmission rate is at least 20% lower. In yet a further aspect, the water vapor transmission rate is at least 30% lower.

In a further aspect, the composition has a water vapor transmission rate that is lower than PET in the absence of PP. In a still further aspect, the water vapor transmission rate is at least 20% lower than PET in the absence of PP. In yet a further aspect, the water vapor transmission rate is at least 30% lower than PET in the absence of PP.

In a further aspect, the composition has a water vapor transmission rate that is lower than PET in the absence of PLA. In a still further aspect, the water vapor transmission rate is at least 20% lower than PET in the absence of PLA. In yet a further aspect, the water vapor transmission rate is at least 30% lower than PET in the absence of PLA.

In a further aspect, the preform weighs less than a preform that does not contain one or more of: (a) the a first polymer comprising a backbone consisting of carbon and hydrogen; (b) the aliphatic polyester, the aliphatic polyamide, or the polyolefin comprising a backbone comprising at least one heteroatom; or (c) the second polymer comprising at least one heteroatom selected from nitrogen, oxygen, sulfur, and halogen, wherein the polymer does not consist essentially of ester, thioester, or amide groups. In a still further aspect, the preform weighs at least about 1% less. In yet a further aspect, the preform weighs at least about 5% less.

In a further aspect, the preform weighs less than a preform that does not contain PP. In a still further aspect, the preform weighs at least about 1% less than a preform that does not contain PP. In yet a further aspect, the preform weighs at least about 5% less than a preform that does not contain PP.

In a further aspect, the preform weighs less than a preform that does not contain PLA. In a still further aspect, the preform weighs at least about 1% less than a preform that does not contain PLA. In yet a further aspect, the preform weighs at least about 5% less than a preform that does not contain PLA.

H. Experimental

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Preparation of a Polymer Blend Compositions

A series of polymer blend compositions were prepared having the concentrations shown in Table 1 below.

TABLE 1

| Composition | PET (%) | PP (%) | PLA (%) | PennColor White (%) |
|---|---|---|---|---|
| 1 | 91 | — | — | 9 |
| 2* | 95 | 5 | — | — |
| 3** | 90 | 10 | — | — |
| 4 | 94 | 5 | — | 1 |
| 5 | 93 | 5 | — | 2 |
| 6 | 92 | 5 | — | 3 |

TABLE 1-continued

| Composition | PET (%) | PP (%) | PLA (%) | PennColor White (%) |
|---|---|---|---|---|
| 7 | 85 | — | 15 | — |
| 8 | 97 | — | 1 | 2 |
| 9 | 95 | — | 1 | 4 |
| 10 | 93 | — | 1 | 6 |
| 11 | 93 | — | 3 | 4 |
| 12 | 91 | — | 5 | 4 |

*80% ppm of Cobalt catalyst component included;
**0.06% reheat (ColorMatrix SmartHeat 85-3243-5) dosed.

2. Light Barrier Effect of PP and PLA

FIG. 1 shows the light barrier effect of compositions 1-9 from Table 1 above. The compositions are labeled as AA.BB.CC in the table, where AA is the percent PP, BB is the percent PLA, and CC is the percent colorant. For example, a composition identified as 50.00.10 comprises 5% PP, 0% PLA, and 1% colorant. Thus, as shown in FIG. 1, compositions containing 5% and 10% PP create a light barrier. Specifically, 5% PP let-down ratio (LDR) results in a transmittance of 1.4% at 500 nm and 10% PP LDR results in a transmittance of 0.8% at 550 nm. Combining PP with 1-3% traditional white colorant creates an even stronger barrier, consistently resulting in a transmittance of <0.4% at a range of wavelengths.

3. Evaluation of Moisture Barrier Properties

As illustrated in Table 2 below, the addition of PP to PET decreases the water vapor transmission rate by a factor of about 20% with 5% PP and about 32% with 10% PP.

TABLE 2

| | | | Test Conditions | |
|---|---|---|---|---|
| Sample | WVTR (g/m$^2$ * day) | WVTR (g/100 in$^2$ * day) | Temp. (° C.) | Relative Humidity (RH) N$_2$ (%) |
| PET | 2.34 | 0.151 | 37.8 | 90 |
|  | 2.38 | 0.147 | 37.8 | 90 |
| PET + 5% PP | 1.84 | 0.119 | 37.8 | 90 |
|  | 1.88 | 0.121 | 37.8 | 90 |
| PET + 10% PP | 1.59 | 0.103 | 37.8 | 90 |
|  | 1.56 | 0.101 | 37.8 | 90 |

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A polymer blend composition consisting essentially of:
(a) polyethylene terephthalate (PET) in an amount of at least 85 wt %;
(b) a colorant in an amount of from 1 wt % to 3 wt % based on the weight of the composition; and
(c) polymethyl pentene in an amount of from 1 wt % to 15 wt % based on the weight of the composition,
wherein the composition does not contain polystyrene in an amount of greater than 5 wt %, and
wherein the transmittance is less than 0.5% at a wavelength of from 500 nm to 600 nm.

2. The composition of claim 1, wherein the PET is present in an amount of from 85 wt % to 95 wt % based on the weight of the composition.

3. The composition of claim 1, wherein the composition further consists essentially of an aliphatic polyester.

4. The composition of claim 3, wherein the aliphatic polyester is polylactic acid (PLA).

5. The composition of claim 4, wherein the aliphatic polyester is present in an amount of from 5 wt % to 25 wt % based on the weight of the composition.

6. The composition of claim 1, wherein the colorant is selected from the group consisting of a white colorant, an opaque colorant, and a translucent colorant.

7. The composition of claim 1, wherein the colorant comprises titanium dioxide.

8. An article comprising the composition of claim 1.

9. A polymer blend composition consisting essentially of:
(a) polyethylene terephthalate (PET) in an amount of from 85 wt % to 95 wt % based on the weight of the composition;
(b) a colorant in an amount of from 1 wt % to 3 wt % based on the weight of the composition; and
(c) polymethyl pentene in an amount of from 1 wt % to 15 wt % based on the weight of the composition,
wherein the composition does not contain polystyrene, and
wherein the transmittance is less than 0.5% at a wavelength of from 500 nm to about 600 nm.

10. The composition of claim 9, wherein the colorant comprises titanium dioxide.

11. An article comprising the composition of claim 9.

12. A polymer blend composition consisting of:
(a) polyethylene terephthalate (PET);
(b) a colorant; and
(c) polymethyl pentene,
wherein polyethylene terephthalate (PET) is present in an amount of from 85 wt % to 95 wt % based on the weight of the composition, the colorant is present in an amount of from 1 wt % to 3 wt % based on the weight of the composition, and polymethyl pentene is present in an amount of from 1 wt % to 15 wt % based on the weight of the composition, and wherein the colorant comprises titanium dioxide, and
wherein the transmittance is less than 0.5% at a wavelength of from 500 nm to 600 nm.

* * * * *